United States Patent
Robertson et al.

(10) Patent No.: US 6,486,895 B1
(45) Date of Patent: *Nov. 26, 2002

(54) DISPLAY SYSTEM FOR DISPLAYING LISTS OF LINKED DOCUMENTS

(75) Inventors: George G. Robertson, Foster City, CA (US); Stuart K. Card, Los Altos, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 981 days.

(21) Appl. No.: 08/525,936

(22) Filed: Sep. 8, 1995

(51) Int. Cl.$^7$ ................................. G09G 5/00
(52) U.S. Cl. .................. 345/776; 345/738; 345/739
(58) Field of Search .................. 395/339, 340, 395/341, 342, 346, 350; 345/776, 738, 739

(56) References Cited

U.S. PATENT DOCUMENTS

| | | | | |
|---|---|---|---|---|
| 5,237,651 A | * | 8/1993 | Randall | 345/350 |
| 5,283,864 A | * | 2/1994 | Knowlton | 345/350 |
| 5,347,295 A | | 9/1994 | Agulnick et al. | 345/350 |
| 5,463,725 A | * | 10/1995 | Henckel et al. | 345/350 |
| 5,500,929 A | * | 3/1996 | Dickinson | 345/356 |
| 5,515,497 A | * | 5/1996 | Itri et al. | 345/348 |
| 5,623,589 A | | 4/1997 | Needham et al. | 345/356 |
| 5,634,095 A | * | 5/1997 | Wang et al. | 345/348 |
| 5,644,740 A | * | 7/1997 | Kiuchi | 345/357 |
| 5,708,780 A | * | 1/1998 | Levergood et al. | 395/200.12 |
| 5,708,825 A | * | 1/1998 | Sotomayor | 395/762 |
| 5,715,314 A | * | 2/1998 | Payne et al. | 380/24 |
| 5,768,578 A | * | 6/1998 | Kirk et al. | 707/63 |
| 5,784,619 A | * | 7/1998 | Evans et al. | 395/682 |
| 5,801,702 A | * | 9/1998 | Dolan et al. | 707/513 |

FOREIGN PATENT DOCUMENTS

WO 97/29414 8/1997

OTHER PUBLICATIONS

Peter Kent, "The Complete Idiot's Next Step with the Internet" Alpha book, 1994, pp. 206–207.*

Ichimura, S., and Matsushita, Y., "Another Dimension to Hypermedia Access", A Report to *Hypertext '93 Proceedings*, The Association of Computing Machinery, Nov. 1993, pp 63–72.

Benest, I.D., Morgan, G., and Smithurst, M.D., "A Humanised Interface To An Eectronic Library", A Report to the *Human–Computer Interaction—Interact '87*, IFIP, 1987, pp. 905–910.

Miyazawa, M., Kinoshita, K., Kobayashi, M., Yokoyama, T., and Matsushita, Y., "An Electronic Book: APTBook", A Report to *Human–Computer Interaction—Interact '90*, IFIP, 1990, pp. 513–519.

Brown, M. H., and Shillner, R. A., "Deckscape: An experimental web browser". Research Report 135a, Digital Equipment Corporation Systems Research Center, Palo Alto, CA., Mar. 1995.

* cited by examiner

Primary Examiner—Ba Huynh

(57) ABSTRACT

A display system for displaying lists of linked documents. The present invention is implemented for displaying lists of related pages downloaded from the World Wide Web. The list of pages is displayed in a book metaphor termed a WebBook. The book metaphor is desirable since it inherently conveys the notion of the pages being related. When displayed, two active pages are displayed at one time. For the WebBook, each page in the list is converted into a page object and will represent a left or right page. Page objects representing a left page will have an axis of rotation along a right edge (as viewed orthogonally) while page objects representing a right page will have an axis of rotation along a left edge (as viewed orthogonally). The changing of pages is animated. Various user interface controls are provided for traversing the pages of the book, creating book marks, scanning pages, scaling the contents of a page, scrolling through pages, etc.

23 Claims, 13 Drawing Sheets

" © 1995 Xerox Corporation" ( 17 U.S.C. 401 )

DISPLAY SYSTEM FOR DISPLAYING LISTS OF LINKED DOCUMENTS

FIELD OF THE INVENTION

The present invention is related to the field of computer user interfaces, in particular a user interface for viewing related documents.

BACKGROUND OF THE INVENTION

The growth of the Internet, and in particular, the facet of the Internet known as the World-Wide-Web (referred to simply as the Web) has been very explosive. The Web provides a means for making multi-media styled documents over the Internet. These documents are termed Web pages (hereinafter pages). Pages may refer to and provide access to other pages on the Web. Each page has associated with it an identifier termed a Uniform Resource Locator (URL). A page is accessed by specifying it's URL. The contents of a page is specified in a document formatting language known as the Hyper-Text Mark-Up Language (HTML). A reference to another page on the Web is termed a link. Links may be specified in either absolute or relative terms. A link specified in absolute terms refers to it's entire URL. A link specified in relative terms assumes a certain portion of the URL is the same as the existing page. The specification is thus relative to the URL of the page on which it is defined.

To access and view a document on the Web, a Web browser is needed. A Web browser provides search, traversal and viewing functions needed to access documents on the Web. Various Web browsers exist for the Web, e.g. NetScape from NetScape, Inc. of Mountain View, Calif. or Mariner from Network Computing Devices Corporation of Mountain View, Calif. Traversing through documents contained on the Web is similar to following a path through a network. Since each page may contain links to many other pages, traversing through the pages is a simple matter of following the links. Most Web browsers provide controls for going backwards and forwards in the list of links. They also maintain a history list of the links to enable jumping directly to a specific previously viewed page.

Most publicly available Web browsers only display one page at a time. The user interface for Web Browsers typically correspond to the capabilities of the computer system on which it resides. A full featured Web browser may provide rendering means for viewing audio, video and graphical portions of documents as well as a graphical user interface for controlling access to documents. The graphical user interface is typically one which provides for vertical and horizontal scrolling via scroll bars and point and click manipulation of a cursor control device to invoke browser operations (e.g. to traverse links). Color, underlining or reverse video are techniques used to indicate the existence of a link on a page.

A more robust Web Browser is described in "Deckscape: An Experimental Web Browser", Marc H. Brown and Robert A. Shillner, DEC Systems Research Center Report 135a, Mar. 1, 1995. The DeckScape web browser utilizes the metaphor of a deck as a collection of Web pages. Only one Web page on a deck is visible at one time, although multiple decks may be visible. DeckScape is also multi-threaded so that each deck may be "active", e.g. downloading pages, at the same time. A deck may be created based on a traversal through the Web or as the result of an operation such as "expand all the links on this page."

The present invention uses a book metaphor to enable a user to browse through a list of web pages. The use of a book metaphor on computer based systems is known in the art. Such a book metaphor has been used as an aid for organizing related files and/or applications. Examples include the TabWorks product available from X-Soft, a division of the Xerox Corporation of Palo Alto, Calif., and the SGI DemoBook available on graphical workstations from Silicon Graphics, Inc. of Mountain View, Calif. The metaphor of a notebook is also used in pen based systems (e.g. the PenPoint Operating systems from the Go Corporation) and personal digital assistants (e.g. the Magic Link product from Sony Corporation).

SUMMARY OF THE INVENTION

A display system for displaying lists of linked documents is disclosed. The present invention is implemented for displaying lists of pages downloaded from the World Wide Web. A list of pages will typically be related in some way. For example, the list of pages may include all the pages defined as relative links on a home page. A home page is typically an entry point for gaining information on a particular person, product, company ,etc., and the relative links are relative to the Uniform Resource Locator (URL) address of the home page.

The list of pages is displayed in a book metaphor, termed a WebBook, on a computer controlled display system. The book metaphor is desirable since it inherently conveys the notion of the pages being related. When displayed, two active pages are displayed at one time. To enable the book metaphor, each page in the list is converted into a page object. Each page object will represent either an left or right page. Page objects representing a left page will have an axis of rotation along a right edge (as viewed by a user) while page representing a right page will have an axis of rotation along a left edge (as viewed by a user). When positioned on the WebBook, the position of the axis of rotation is generally the same as the spine of the WebBook.

The turning of pages in the present invention is animated. The animation sequence for turning or ruffling pages is generally the same. Ruffling can be thought of as multiple concurrent page turns. Generally, the sequence of steps is to rotate the page to be turned about the axis of rotation, rotate the page on the other side of the page to be turned about the axis of rotation, at a point orthogonal to the viewer, turn off the page to be turned and turn on the page on the other side, turn off the page being covered, and turn on the new page being revealed by the page turn.

Various user interface controls are provided for traversing the pages of the book, creating book marks, scanning pages, scaling the contents of a page, scrolling through pages, etc.

DETAILED DESCRIPTION OF THE INVENTION

Figure 1:
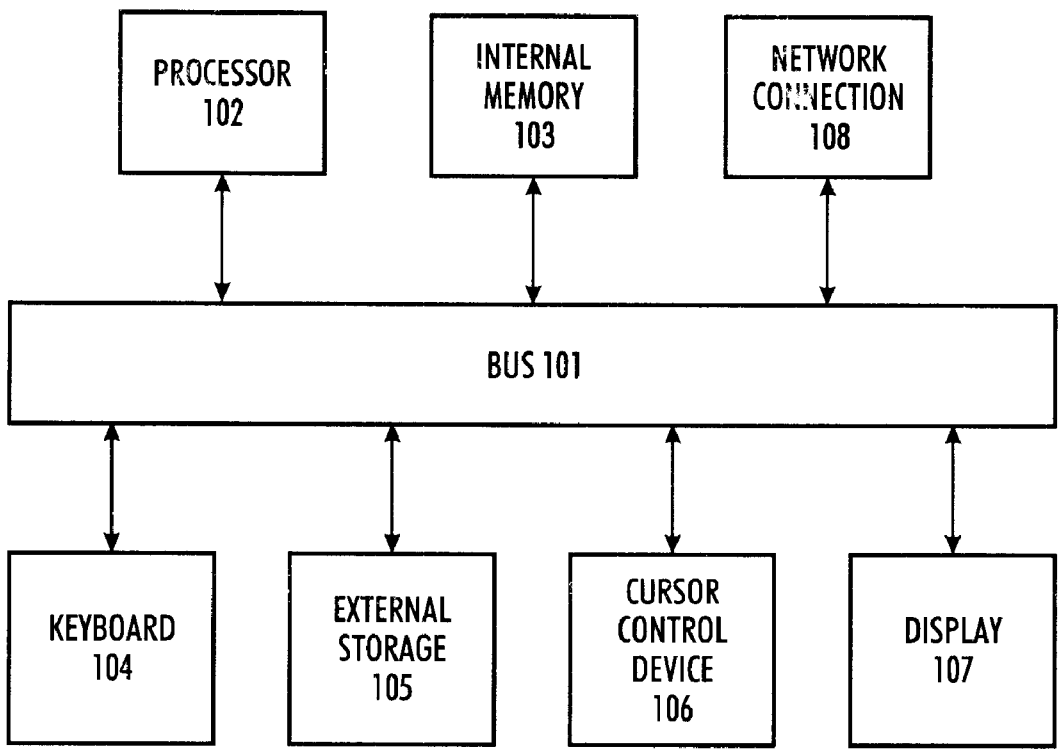
FIG. 1 is a block diagram of a computer controlled display system as may be utilized in the currently preferred embodiment of the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A display system for displaying lists of linked documents is disclosed. An example of linked documents are hyper-text documents in a hyper-text system, e.g. the HyperCard system from Apple Computers of Cupertino Calif. The present invention provides a higher level of abstraction for systems which traverse through linked documents. This abstraction provides for organizing and providing access to documents using a metaphor which inherently indicates a relationship between the documents.

The currently preferred embodiment of the present invention is implemented for use on lists of linked documents obtained from the portion of the Internet known as the World Wide Web (hereinafter the Web). However, it should be noted that the present invention is not limited to use on the Web and may be utilized in any system which provides access to linked documents. The following terms defined herein are familiar to users of the Web and take on these familiar meanings:

World-Wide Web or Web: The portion of the Internet that is used to store and access linked multi-media documents.

Page: A document accessible on the Web. A Page may have multi-media content as well as relative and absolute links to other pages.

Home Page: A page functioning as an entry point to a set of related pages on the Web. A home page will typically have a plurality of relative links to related pages.

Hyper-Text Mark-Up Language (HTML): The formatting language for specifying the contents of a page.

Uniform Resource Locator (URL): The address or identifier for a page on the Web.

Server: An addressable storage device residing on the Internet which stores Web Pages.

Link: An indicator on a Web page which refers to another Web page and which can typically be retrieved in a point and click fashion. The Link will specify the URL of the other Web page.

Relative Link: A Link with a URL that is specified relative to the Web page on which the link exists. Relative links are used for groupings of related pages that typically reside on the same server so that these groups of pages can be easily moved without having to modify the link specifications in the group of related pages.

Absolute Link: A URL that provides a full or actual URL address for a page.

Web Browser or Browser: A tool which enables a user to traverse through and view documents residing on the Web. Other rendering means associated with the Browser will permit listening to audio portions of a document or viewing video or image portions of a document.

The present invention is implemented for use for viewing lists of linked documents. This capability of viewing lists is a component of a system for interacting with pages downloaded from the Web. This system is described in greater detail below. A list of linked documents can be created in various ways. One such way is to follow the relative links on a "home page". Another way would be to create the list manually by traversal through pages on the Web.

The currently preferred embodiment of the present invention presents the list of pages to a user in a book metaphor hereinafter referred to as a WebBook. The book metaphor is useful since it conveys a relationship between the different pages. Each page in the WebBook represents a page in the list. When the WebBook is open, two pages are visible. Each page has its own set of page controls. The WebBook is implemented for display on a Computer Controlled Display System which is described below.

Conceptually, the WebBook provides a new way of interacting with and organizing Web pages. Heretofore, only individual pages are transmitted on the Web. Any relationship between the pages received is determined by the person accessing the pages. Using the notion of the WebBook, pages could be organized so that lists of pages could be easily transmitted. So for example, a company wanting to provide information about its products could take advantage of relative links and organize a home page to have relative links to all its products descriptions. A user could subsequently access this home page download the homepage and the pages at its relative links and create a WebBook about that company's products.

Overview of a Computer Controlled Display System in the Currently Preferred Embodiment of the Present Invention The computer based system on which the currently preferred embodiment of the present invention may be implemented is described with reference to FIG. 1. The computer based system and associated operating instructions (e.g. software) embody circuitry used to implement the present invention. Referring to FIG. 1, the computer based system is comprised of a plurality of components coupled via a bus 101. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access and Read Only Memories). The processor 102 will be used to perform various operations in support of obtaining Web pages and converting into a suitable format for the WebBook. Instructions for performing such operations are retrieved from Internal memory 103. Such operations that would be performed by the processor 102 would include the processing steps described in FIG. 2. The processor 102 and Internal memory 103 may be discrete components or a single integrated device such as an Application Specification Integrated Circuit (ASIC) chip.

Also coupled to the bus 101 are a keyboard 104 for entering alphanumeric input, external storage 105 for storing data, a cursor control device 106 for manipulating a cursor, a display 107 for displaying visual output (e.g. the WebBook) and a network connection 108. The keyboard 104 would typically be a standard QWERTY keyboard but may also be telephone like keypad. The external storage 105 may be fixed or removable magnetic or optical disk drive. The cursor control device 106, e.g. a mouse or trackball, will typically have a button or switch associated with it to which the performance of certain functions can be programmed. The network connection 108 provides means for attaching to a network, e.g. a Local Area Network (LAN) card or modem card with appropriate software. The network ultimately attached to is the Internet, but it may be through intermediary networks or On-Line services such as America On-Line, Prodigy TM or CompuServ TM.

The present invention is implemented on a computer controlled display system having a Graphical User Interface (GUI). Such a GUI will also support operations such as "point and click". A "point and click" operation is one where a cursor on a display screen is positioned over a desired portion of the display, such as an icon, using a cursor control device such as a mouse or trackball. Once the cursor is appropriately positioned, a button/switch associated with the cursor control device is quickly depressed and released. This creates an electrical signal which causes a predetermined and context dependent operation to occur. Other operations may require a "drag" where the button/switch is depressed to "pick-up" and move an object and released to "drop" the object.

The currently preferred embodiment of the present invention has been implemented on a Silicon Graphics workstation with graphics facilities as described in SGI Graphics Library Programming Guide, Silicon Graphics, Inc. of Mountain View, Calif. The Silicon Graphics workstation provides for manipulating graphical objects in a three dimensional space. However, it would have been apparent to one of skill in the art to implement the present invention on other suitable computer systems providing graphical functionality which manipulate graphical objects in a two dimensional space. Such implementations would not depart from the spirit and scope of the present invention.

Overview

Figure 2:
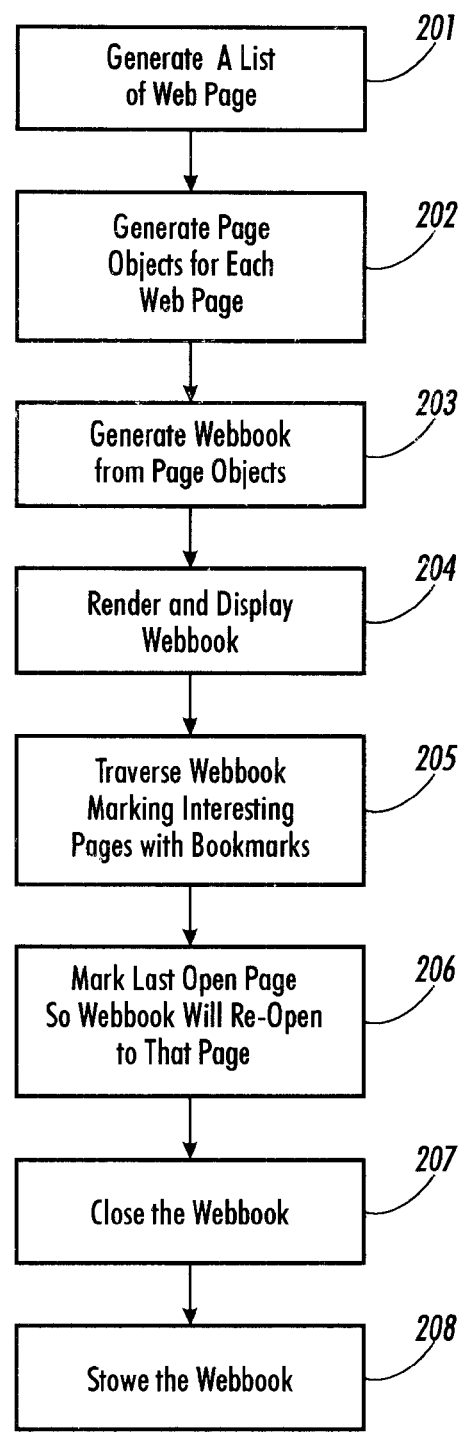
FIG. 2 is flowchart illustrating the basic steps for creating and operating a WebBook in the currently preferred embodiment of the present invention.

FIG. 2 illustrates the steps for generating and using the WebBook of the present invention. Referring to FIG. 2, the first step is to generate or otherwise obtain a list of Web Pages, step 201. This can be accomplished in various ways. One way is to analyze a page, such as a home page, and follow and download all the relative links on the home page. This is repeated for each subsequent page. Following relative links is useful since these pages will typically be closely related. Each page on a chain of relative links would then be included in the set of pages. Variations on this would limit the number of relative links traversed. This list of pages will be in the order that they would appear in the book.

Next, page objects for each web page are generated, step 202. A page object is the internal representation of a web page for use in the book metaphor. Page objects and their contents are described in greater detail below. Next, the WebBook is generated from the page objects, step 203. The WebBook has a basic structure which lists the pages and provides various controls. When a user opens the WebBook it is rendered by the computer controlled display system and displayed on a display, step 204. The first time the book is opened, the cover will be displayed, or alternatively a first page (depending on whether the book has a cover). Subsequent instances of opening the book will cause it to be opened at the point where it was last closed. As will be described in detail below, only those pages corresponding to a particular page in a book are visible. Other page objects are marked as not displayed.

The user then traverses the WebBook using page turning operations and marking interesting pages until they are done viewing or using the WebBook, step 205. The page turning operations are animated so as to give the user a sense of an actual page turning. When they are done, the page in the WebBook last open is marked in the WebBook, step 206 and WebBook is closed, step 207. Optionally, the WebBook may be stowed, step 208. Stowing the WebBook is equivalent of putting a book on a bookshelf.

WebBooks themselves may be organized as collections and stored as icons on a bookshelf. This would permit the storing of multiple WebBooks each having their own related subject. WebBooks may also be transferred and used by other users. Finally, pages may be added to a WebBook. This would require creation of a page object(s) for the added page(s) and regeneration of the WebBook.

Figure 3:
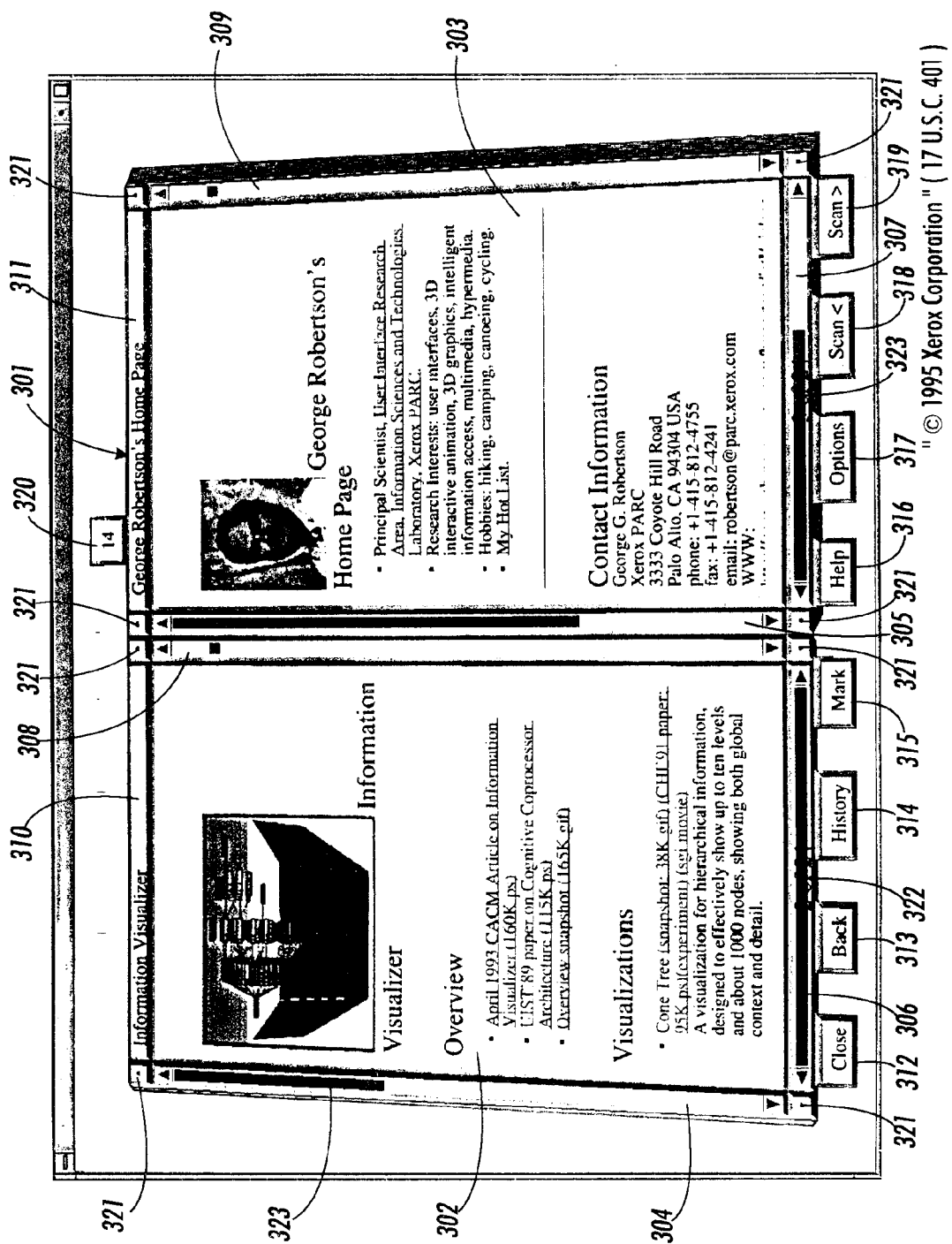
FIG. 3 is an illustration of an open WebBook in the currently preferred embodiment of the present invention.

FIG. 3 is an illustration of a WebBook as displayed on a display. Referring to FIG. 3, the WebBook 301 is comprised of a first page 302 and a second page 303, each having an identical structure. The first page 302 is an instance of a left page and the second page 303 is an instance of a right page. Vertical scroll bars 304 and 305 provide for vertical scrolling on their respective pages. Horizontal scroll bars 306 and 307 provide for horizontal scrolling on their respective pages. Superimposed within the horizontal scroll bars are page references 322 and 323 which indicate the page number in the book for each page. Scaling bars 308 and 309 enable font scaling on the respective pages. Each of the pages also has a title bar 310 and 311 which is used to indicate the title of the respective page. The content and layout of the page is determined by the HTML macros defining the page.

Book control buttons are presented at the bottom edge of the WebBook 301. A close button 312 provides for closing the book. A back button 313 provides for looking at a prior page. A history button 314 provides for reviewing the history of pages looked at. A mark button 315 provides for creating a bookmark for a page being viewed. Such a bookmark 320 is illustrated in FIG. 3 indicating that page 14 has been marked. A help button 316 provides for invoking various help functions for the WebBook 301. The help functions are in the form of text describing how to perform particular functions in the WebBook. The options button 317 provides for specifying various operational parameters in the Web-Book. An example is specifying the timing for flipping pages in the WebBook. The button 318 labeled "Scan <" provides for automatic scanning of pages to the lower numbered pages. The button 319 labeled "Scan >" provides for automatic scanning of pages to the higher numbered pages. Re-sizing boxes 321 may be used to re-size the WebBook 301 using a point and drag function.

Finally, book edge areas 322 and 323 are used to provide a visual indication of relative positioning within the book, e.g. the number of pages on that "side" of the book. The book edge areas 322 and 323 will change in size as the pages are traversed. Also, the book edge areas may be used as a means for directly accessing pages in the book (e.g. mimicking the activity of thumbing through the book in groups of pages). This is accomplished by a point and click operation pointing to the edge.

It should also be noted that color or some other highlighting technique may be used with respect to the page contents to indicate links to other pages. Note that these links and the highlighting technique are defined within the HTML specification for the page contents. A particular color may denote a link to a page within the WebBook, and another color used to indicate a link to a page external to the WebBook. Generally, a point and click operation on the highlighted portion will cause the linked-to page to be accessed and displayed.

Figure 4:
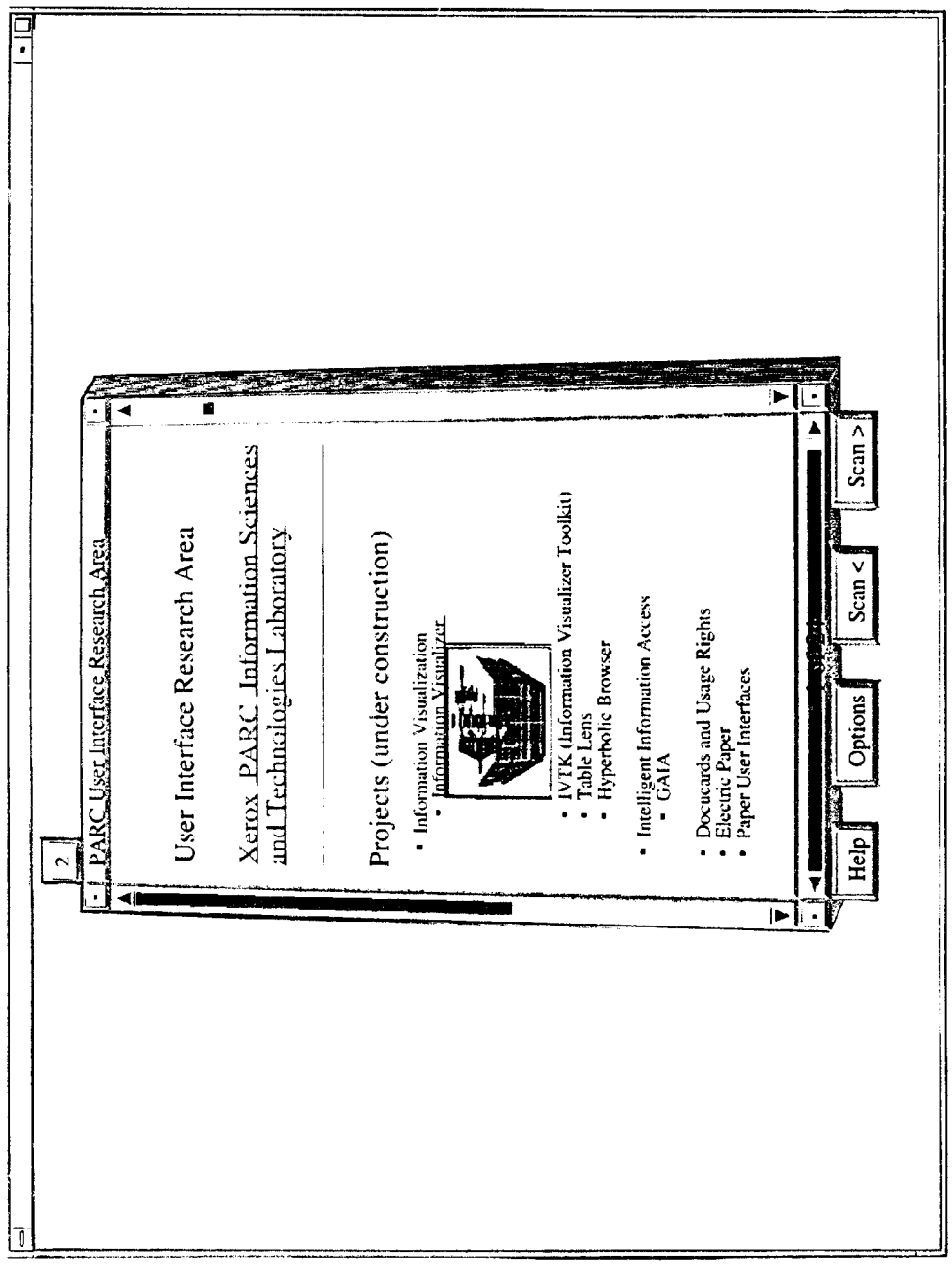
FIG. 4 is an illustration of a first page of a WebBook without a cover.
Figure 5:
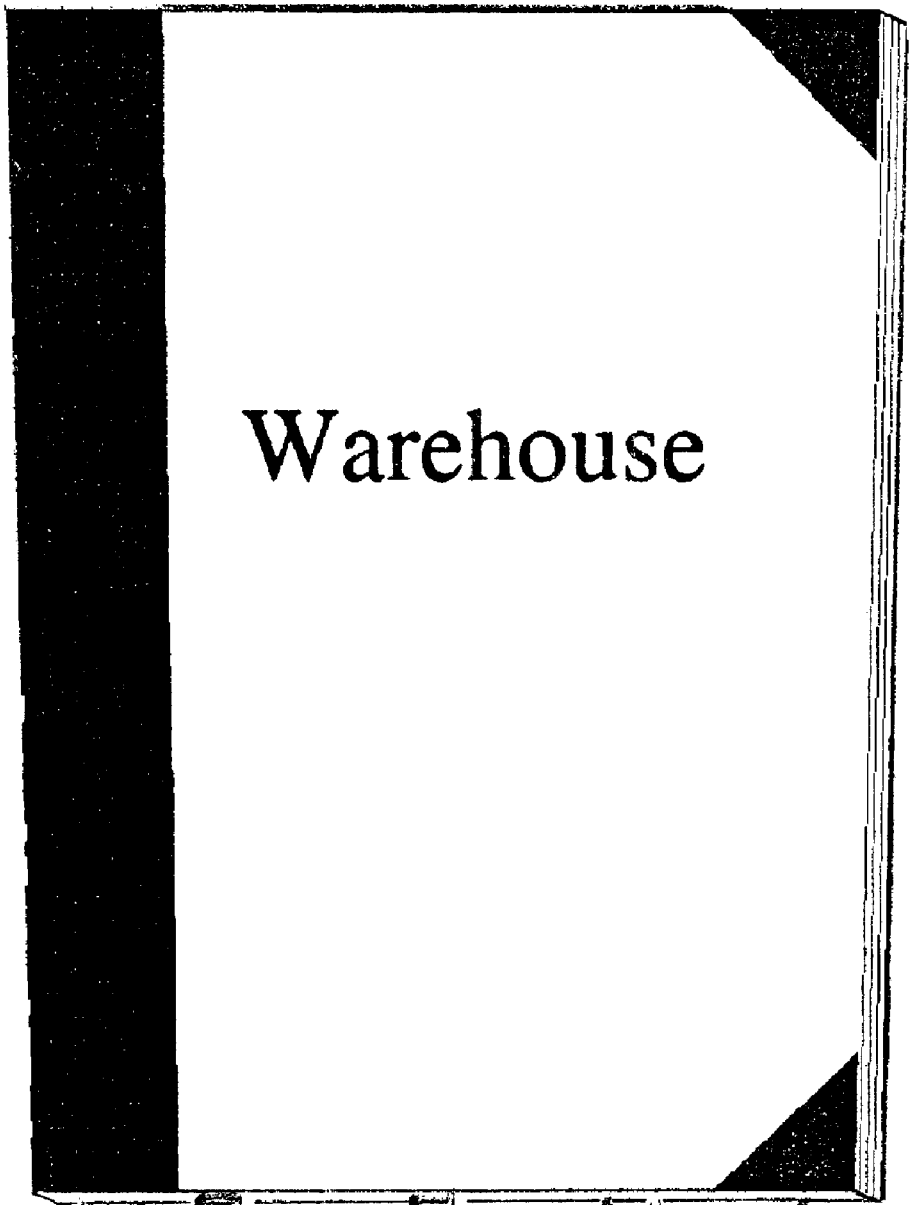
FIG. 5 is an illustration of a WebBook having a cover.

A WebBook may be displayed without a cover (FIG. 4), or with a cover (FIG. 5). Referring to FIG. 4, when displayed without a cover, the first thing that a user will see is the first page in the created list of pages. Further, when displayed without a cover, the first page will be a right page in the WebBook. Referring to FIG. 5, when displayed with a cover, the contents of the WebBook is hidden. Display of a cover may be useful for security purposes, wherein a password or other security mechanism may be required before the book may be opened. Further, when displayed with a cover, the first page will be a left page in the WebBook (since when opened two pages are displayed.)

Generating a List of Pages

Obtaining a list of pages for the WebBook can happen in one of many ways. As mentioned above, one way is to gather all the relative links that originate from a particular home page. It has been determined through observation that the use of relative links is a common indicator of pages that are related. This is because the use of relative links makes a collection of pages easily transportable (e.g. to move the pages from one server to another). During this process of following the relative links, each page is retrieved and stored. In this technique the pages would be ordered so as to retain relationships. In other words, for a first relative link on a home page, all subsequent relative links are ordered sequentially. They would be followed by a second relative link on the home page followed by all its subsequent relative links. This ordering will allow related pages to be grouped sequentially within the WebBook. An exception is that relative links that are specified two or more times are represented in the list only once (e.g. typically the home page is specified on each page).

Other techniques for creating lists of pages may be used so long as they produce a list that is ordered in the way that the pages would appear in the WebBook.

WebBook

The WebBook is created from the list of page objects. The WebBook is merely a control structure for manipulating and controlling the page objects. The page objects are positioned in a 3-D space so that that they are co-planer.

Figure 6:
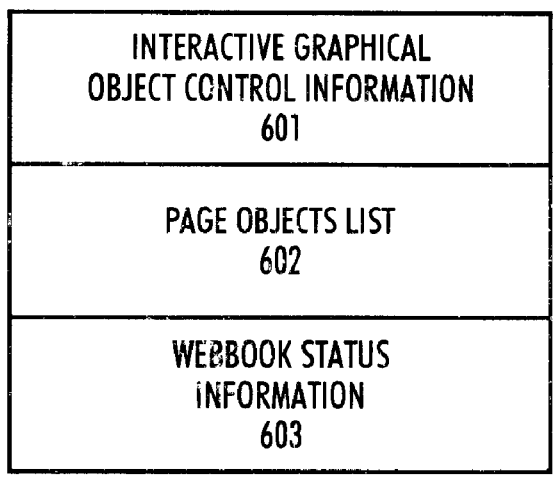
FIG. 6 is a block diagram of a WebBook data structure.

FIG. 6 illustrates a data structure for a WebBook. It should be noted that the WebBook data structure is dynamic and changes as the book is changed (e.g. bookmarks added). The currently preferred embodiment of the present invention utilizes object oriented programming techniques. So the data structure represents a WebBook object in that context. In any event, the data structure is comprised of a graphical control portion 601, a list of page objects 602 and WebBook status information 603. The graphical control portion 601 contains various information for controlling interactive graphical objects. Such information includes transient properties for animation control, 3-D rendering information and a list of "children" objects. The children objects are graphical objects that are manipulated when the WebBook is manipulated. Such objects would include page objects and the graphical objects representing the control buttons and page markers. The list of page objects 602 is merely a page sequence reference to the page objects. The WebBook status information 603 contains various information about the state of the WebBook at a point in time.

The information contained in the objects further specify software routines which utilize the information contained in the object to actually perform the desired function.

Page Object

As described above, a prerequisite to creating the WebBook is converting each Web page into a page object. Each page is provided in the order in which it is to appear in the WebBook. Accordingly, each page object will represent either a left page or a right page in the WebBook.

Figure 7:
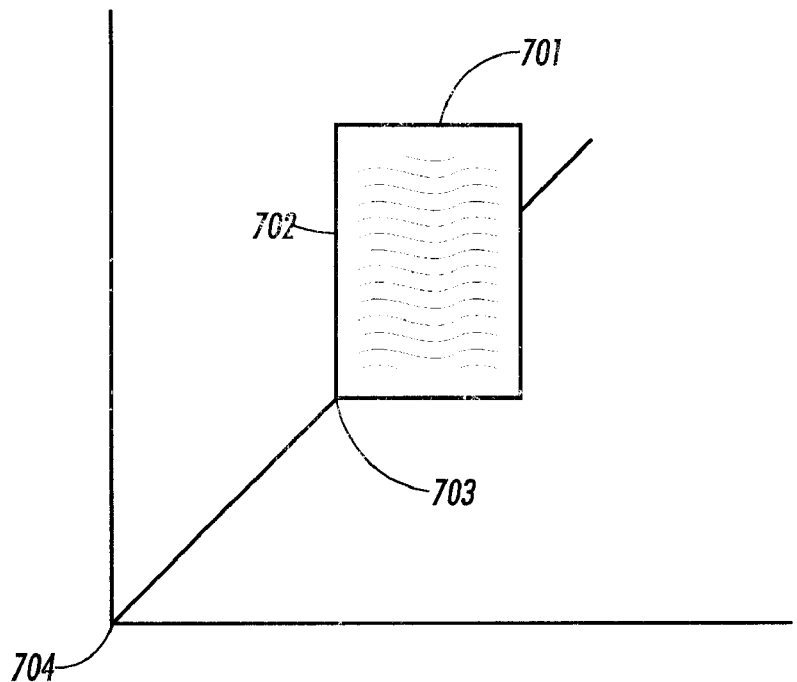
FIGS. 7 and 8 are illustrations of a spatial perspective of left and right page objects.

A page object from a spatial perspective is illustrated in FIG. 7. FIG. 7 illustrates a page object as a plane 701 in 3-D space with respect to axes 704. The plane 701 represents the actual "page" of information on which content is displayed. The plane 701 has associated with it content 702 and an axis of rotation 703 along the right edge (from the viewers perspective). The page object of FIG. 7 represents a left page. The axis of rotation 703 indicates where the page will be turned (i.e. the spine of the WebBook). The content 702 is the HTML formatted text and image information for the page.

Figure 8:
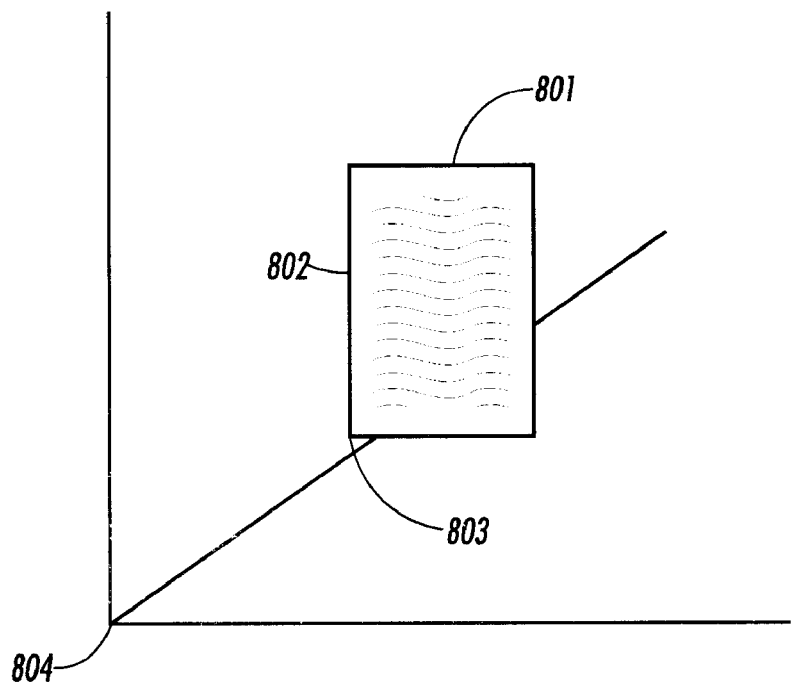

The page object of FIG. 8 represents a right page. Plane 801 has associated with it content 802. The significant difference is that the axis of rotation 803 is on the left edge of the plane (from the viewers perspective). So when a the page turns, it will occur in the opposite orientation then for a left page.

For each page object, the content is rendered onto the plane. Generally, the plane is the size of the book (which can be re-sized by the user), so the user will scroll through the content. In the currently preferred embodiment, texture mapping techniques are used to render the elements of the page content onto the plane. However, on computer based systems not supporting texture mapping other rendering techniques may be utilized without departure from the spirit and scope of the present invention. When displayed as part of the WebBook the display of each page object may be turned on and off.

Figure 9:
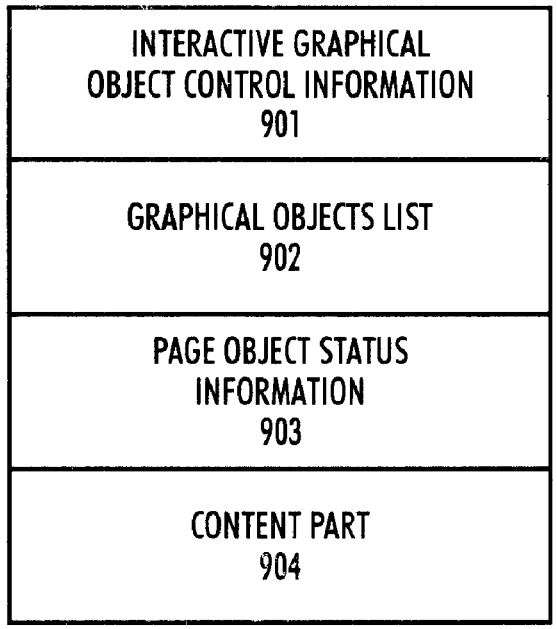
FIG. 9 is a block diagram of a Page Object data structure.

FIG. 9 is a block diagram of the data structure for a page object. The data structure for a page object has the same basic interactive graphical control information as described above with reference to the WebBook, namely interactive graphical object information part 901, a graphical objects list 902 and page objects status information 903. Other graphical information objects specified in the graphical objects list 902 include scroll bars, re-size boxes and a title banner. The page objects status information 903 includes information as to location and whether or not the content is to be displayed. The major difference is the inclusion of a content part 904. The content part 904 contains various line oriented information about the content of the page including the HTML specification, the spatial location of each of the lines, scaling information, margin information and information about selectable regions (links). This information is used to render the page content consistent with the HTML specification.

Turning Pages

A visually appealing aspect of the present invention is the turning of pages. The turning of pages is animated. This provides the user with a visual effect approximating the physical activity of turning a page in a book. Generally, the sequence of steps is to rotate the page to be turned about the axis of rotation, rotate the page on the other side of the page to be turned about the axis of rotation, at a point orthogonal to the viewer turn off the page to be turned and turn on the page on the other side, turn off the page being covered, and turn on the new page being revealed by the page turn.

It should be noted that "turning" pages is also accomplished in various ways. One is through a point and click operation on a page or page edge using a cursor control device. In the currently preferred embodiment, pointing and clicking on the left page (or left page edge) will cause the next lower pair of pages to be turned to. Conversely, point and clicking on the right page (or right page edge) will cause the next higher pair of pages to be turned to. Of course other means of interacting with the page, e.g. the use of gestures such as drag cursor left or drag cursor right could be used to implement page turning in the corresponding direction. Page turning may also occur through use of the scan operation provided with the WebBook. The scan operation will cause the pages to turn at a predetermined rate.

Figure 10:
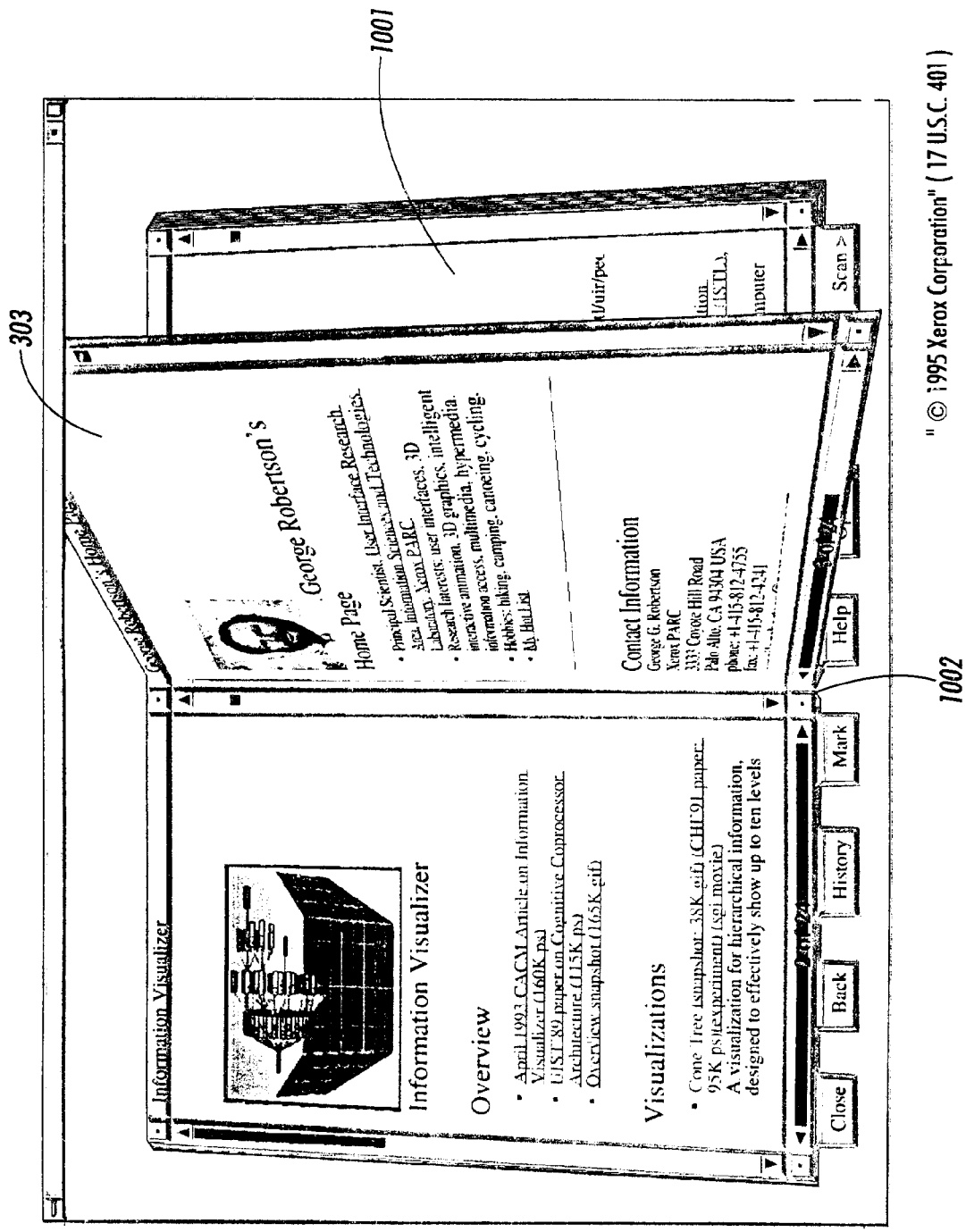
FIGS. 10 and 11 are a series of illustrations showing a page turn of the WebBook.
Figure 11:
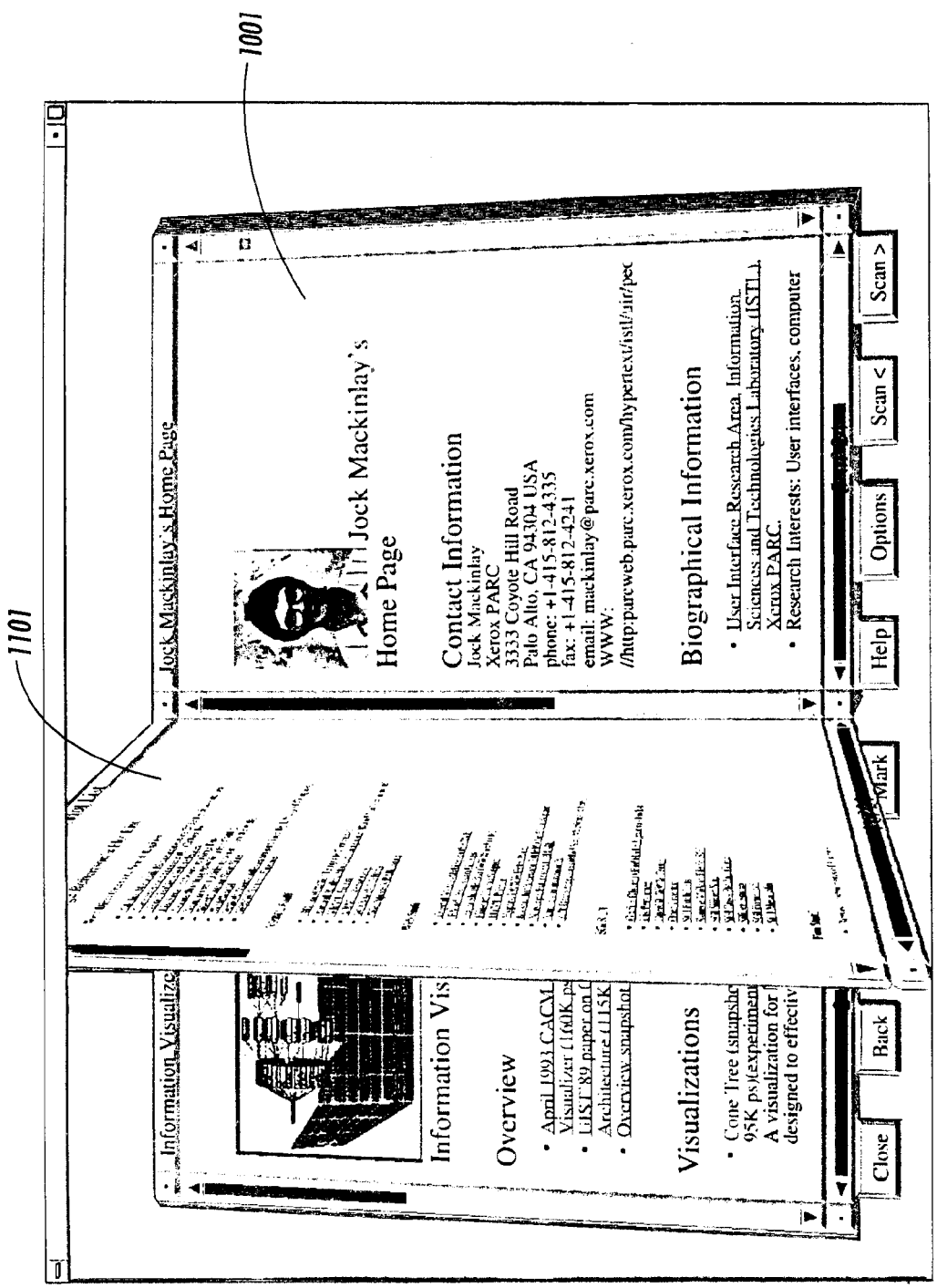

FIGS. 10 and 11 are illustrations of steps in a page turn in the present invention. Referring to FIG. 10, a page turn operation of the page 303 of FIG. 3 has been initiated. Although not illustrated a first step in accomplishing a visually pleasing page turn is to offset page 303 with the page being revealed. It has been determined that during a page turn, if the pages become co-planer, the content of the page being turned becomes jumbled. This is because the page being revealed two pages hence or before has content which is being revealed. In any event, as the page 303 rotates along an axis 1002 corresponding to the spine of a book, a page 1001 is being revealed. It should be noted that the page 303 remains in a rigid plane as it turns. As noted above, the speed at which this turn appears can be modified by the user. Referring to FIG. 11, at a certain point in the rotation, a page 1101, that is on the "other side" of page 303 becomes visible. A page 1102 is also being visible. At predetermined points during the page turn, the content of pages 302 and 303 are turned off indicating that the page is turned. Although not illustrated, the rotation of the page continues until the page 1101 and 1102 are revealed to complete the animation effect of a page turn.

It is worth noting that for a page turn, two page objects will be rotating. Conceptually, left and right pages are positioned back to back. So a page turn involves rotating each in unison to simulate the actual turning of a page.

Figure 12:
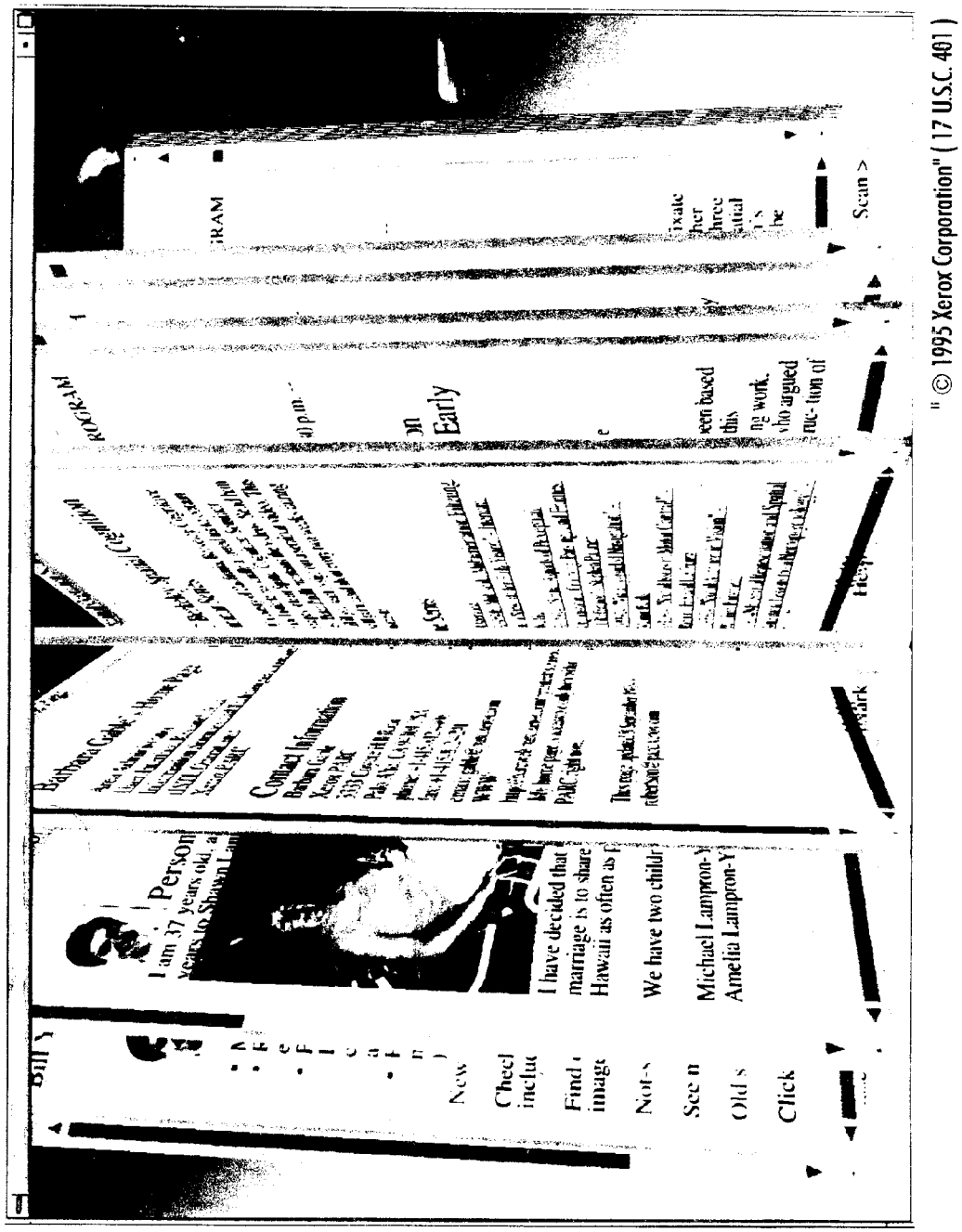
FIG. 12 is an illustration of ruffling through the pages of a WebBook.

The animation sequence for turning pages or ruffling pages is generally the same. Ruffling can be thought of as multiple concurrent page turns. FIG. 12 is an illustration of a step in the ruffling through the pages of a WebBook. Referring to FIG. 12 a plurality of pages are being turned concurrently. A difference in ruffling is that intermediate pages are never fully visible to the user since it is quickly being overlaid by a next page. Ruffling in the currently preferred embodiment is invoked by pointing to a page and holding down the button on the cursor control device for at least a predetermined time. When the button associated with the cursor control device is released, the ruffling will stop.

Figure 13:
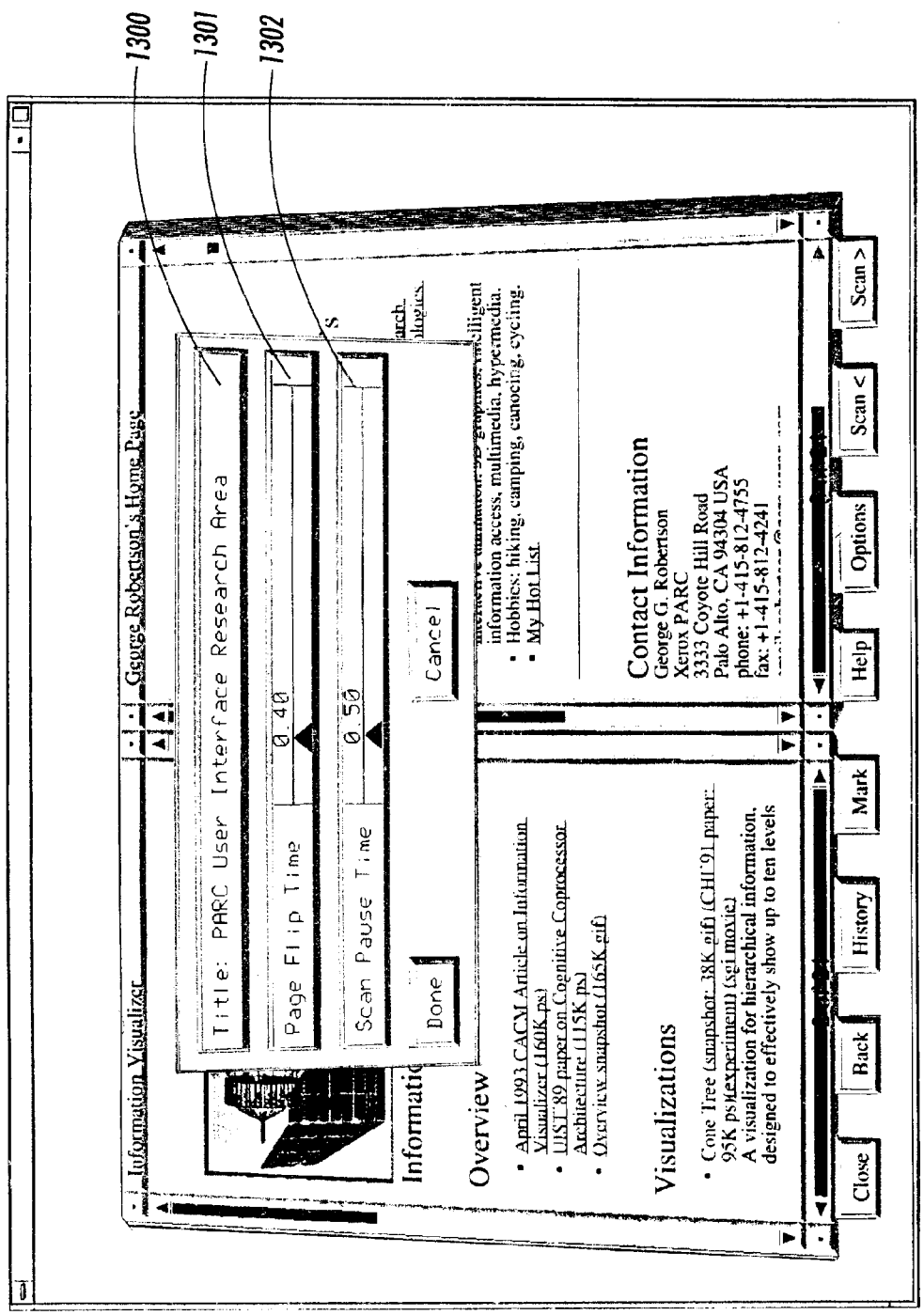
FIG. 13 is an illustration of a pop-up window for controlling temporal parameters for animating page turns.

FIG. 13 illustrates a pop-up window 1300 for controlling the temporal parameters for the page turn and scan. A first temporal parameter, page flip time, is controlled by bar 1301. The page flip time refers to how long it takes a page to completely turn. A second temporal parameter, scan pause time, is controlled by bar 1302. The scan pause time refers to a pause in between page turns during a scan operation. The pop up window 1300 is invoked through the options button. The bars 1301 and 1302 are operated by a drag operation along the bar. Moving the corresponding indicator to the left or right will cause corresponding increases or decreases in the amount of time to perform the page flip or to initiate another page turn in a scan. As seen in FIG. 13, the set time parameter is displayed adjacent to the indicator.

Scaling

Figure 14:
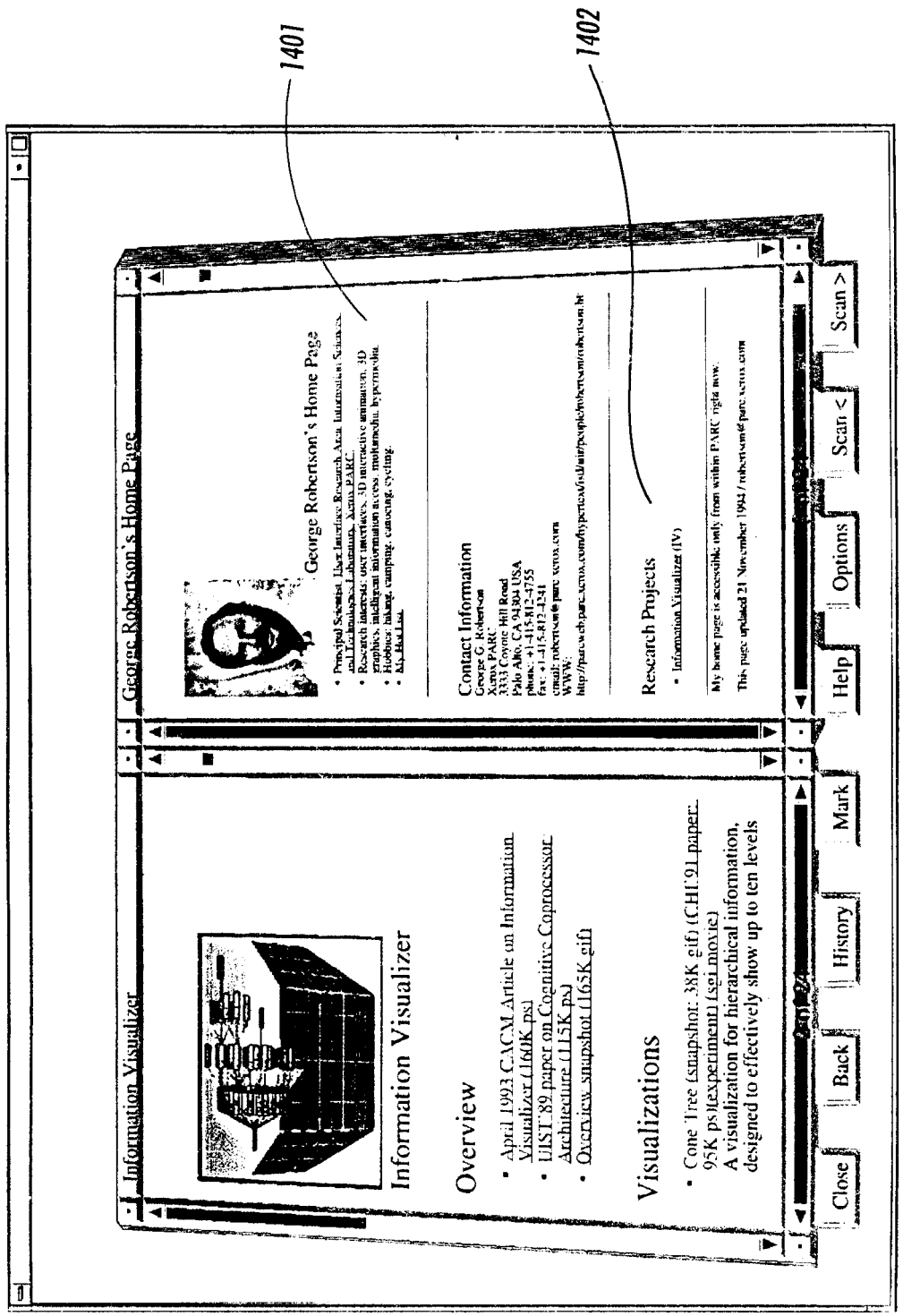
FIG. 14 is an illustration of the scaling of page contents on a page of the WebBook illustrated in FIG. 3.

FIG. 14 is an illustration of the scaling of page contents on a page in a WebBook. The scaling of the contents of a page is useful in order to show as much textual data on the page as possible. The scaling of the present invention is not mere reduction of the image. It is akin to font scaling on a word processor which automatically fits as much text as possible on a line. As noted above scaling is user controlled through scaling bars that are provided in the WebBook. This is accomplished by a drag operation on the scale indicator. Referring to FIG. 14, the page 303 of FIG. 3 has been scaled as reflect by page 1401 so that more text can be placed on a line. Further as indicated by the information under the heading "Research Projects" 1402, more overall text is displayed.

Scaling is accomplished by recalculating scaling factors for the font as the scaling scroll bar is moved. For each display step while the scaling scroll bar is moving, a new scaling factor is calculated and the text scaling performed. The scaling of the present invention operates like a word processor wherein it is desired to squeeze as much text onto a line as possible.

A Web Browsing System

Figure 15:
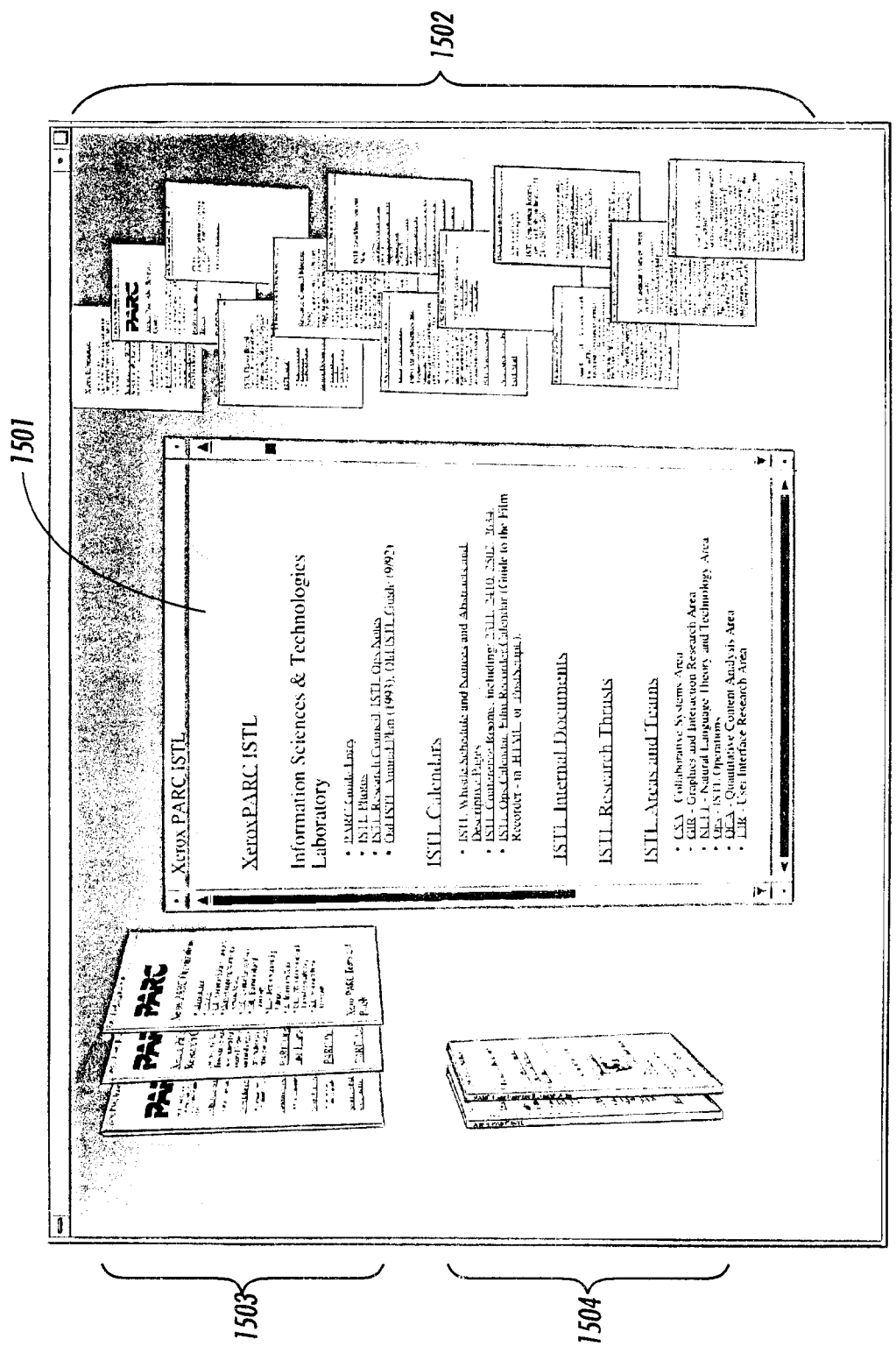
FIG. 15 is an illustration of a web browsing system of which the currently preferred embodiment of the present invention may be used as a component.

As described above the present invention is a feature of a complete Web Browsing system. This Web Browsing System is described with reference to FIG. 15. In FIG. 15, a current web page 1501 is displayed in the center of the viewing area. From the viewers perspective, to the right is an area 1502 containing a collection of "thumbnail" images of pages that have some relationship to the current page 1501. These pages have not yet been viewed by the user. The upper left of the current page 1501 is an area 1503 containing pages which have been viewed by the user. As the user views pages and skips to different pages, the prior current page is moved to the area 1503. It should be noted that the collection of pages, i.e. the current page 1501 and the pages in the areas 1502 and 1503 themselves may be pages from a WebBook.

Finally, to the lower left of the current page 1501 is a bookshelf area 1504. It is in this area where WebBooks are maintained. The WebBooks may be opened using a point and click operation with a cursor control device. Alternatively, the WebBooks may be opened because a link in the current page 1501 refers to a page in the WebBook. In any event, when a WebBook is opened, it can be operated in the manner described above.

Thus, a computer controlled display system for displaying lists of linked documents is disclosed. While the present invention is described with respect to a preferred embodiment, it would be apparent to one skilled in the art to practice the present invention with other configurations. Such alternate embodiments would not cause departure from the spirit and scope of the present invention.

What is claimed is:

1. A computer controlled display system having a display, processor and a cursor control device, said computer controlled display system for controlling the display of a list of linked documents comprising:

document list generation circuitry coupled to access a collection of linked documents, wherein a plurality of said collection of linked documents reside on a common server, said documents residing on said common server having relative links to other documents residing on said common server, said document list circuitry for generating and obtaining an ordered list of linked documents residing on said common server using said relative links;

a storage device coupled to said document list generation circuitry, said storage device for storing said ordered list of linked documents;

page object generation circuitry coupled to said storage device, said page object generation circuitry for generating page objects for each document in said list of linked documents, each of said page objects comprising a content portion and a page control portion;

book generation circuitry coupled to said page object generation circuitry, said book generation circuitry for generating a representation of said ordered list of linked documents as a book for displaying on said display based on the order of said list of linked documents, said book on said display comprising:

a first area for displaying a first page object as a first left page of a book displayed on said display, said first left page having active contents when displayed;

a second area for displaying a second page object as a second right page of said book displayed on said display, said second right page having active contents when displayed; and a control area for displaying control buttons, said control buttons for enabling a user to generate input to said book generation circuitry for generating subsequent representations of said list of linked documents.

2. The computer controlled display system as recited in claim 1 wherein each of said first area and said second area is further comprised of a scale control area for scaling the display of the content of a page object.

3. The computer controlled display system as recited in claim 1 wherein each of said first area and said second area is further comprised of a vertical scrolling area for enabling vertical scrolling of the display of the content of a page object and a horizontal scrolling area for enabling horizontal scrolling of the display of the content of a page object.

4. The computer controlled display system as recited in claim 3 wherein said book on said display further comprises page edge overlap areas for indicating a relative page order of pages displayed in said first area and said second area.

5. The computer controlled display system as recited in claim 4 wherein said book generation circuitry further comprises page turning circuitry for causing new page objects to be displayed in said book responsive to a user interaction with said cursor control device in said first area, said second area or said page edge overlap areas.

6. The computer controlled display system as recited in claim 5 wherein said control area includes a first scan button for causing pages to be turned in a first direction and a second scan button for causing pages to be turned in a second direction.

7. The computer controlled display system as recited in claim 1 wherein said control area includes a mark button for marking a page object currently being displayed and causing a corresponding bookmark to be displayed.

8. The computer controlled display system as recited in claim 1 further comprising means for opening said book to the page displayed when the book was closed.

9. The computer controlled display system as recited in claim 1 wherein said book in said display further comprises re-sizing areas for changing the size of said book.

10. The computer controlled display system as recited in claim 1 wherein said book generation circuitry further comprises highlighting circuitry for causing links within said list of linked documents to be displayed in a first visually distinct manner and links outside of said list of linked documents to be displayed in a second visually distinct manner.

11. On a computer controlled display system having a display and a cursor control device, a method for presenting lists of linked documents for viewing which are part of a collection of linked documents, wherein a plurality of said collection of linked documents reside on a common server, said documents residing on said common server having relative links to other documents residing on said common server, said method comprising the steps of:

a) obtaining an ordered list of linked documents and the content of said linked documents residing on said common server using said relative links;

b) generating page objects for each linked document, said page objects containing the content of an associated linked document and page control information;

c) organizing said generated page objects in a computer displayable representation of a book according to the ordered list, wherein each page object corresponds to a document in said ordered list of linked documents, each of said page objects being active when displayed, said representation of a book further containing a plurality of control areas for turning pages of said book, each of said plurality of control areas causing pages to turn in a predetermined action;

d) a user opening said book;

e) rendering and displaying said active page objects of said book on said display; and f) said user viewing and traversing said book by invoking a page turning operation in said plurality of control areas or by selecting links to other documents in said ordered list of linked documents until finished with viewing said book.

12. The method as recited in claim 11 comprising the steps of:

i) said user re-opening said book; and j) displaying said book at said marked last open page.

13. The method as recited in claim 11 said step of said user traversing said book by invoking page turning operation in said plurality of control areas until finished with viewing said book is comprised of the steps of:

said user operating a cursor control device to position a cursor into a desired control area;

said user invoking a desired turning operation using a predetermined interaction; and turning pages of said book in the direction associated with said desired control area and in the manner associated with said desired page turning operation.

14. The method as recited in claim 13 wherein said predetermined interaction is a single click on said cursor control device and said desired page turning operation is a single page turn.

15. The method as recited in claim 13 wherein said predetermined interaction is a click and hold on said cursor control device and said desired page turning operation is a page ruffle.

16. The method as recited in claim 11 wherein concurrent with said step of said user traversing said book by invoking page turning operation in said plurality of control areas until finished with viewing said book, performing the steps of:

said user indicating a page to be marked;

displaying page marks on said marked page; and updating said book representation to include the marked pages so that when the book is re-opened the page marks are displayed.

17. The computer controlled display system as recited in claim 1 wherein said document list generation circuitry is further comprised of circuitry for creating an ordered list of linked documents based on said relative links.

18. The computer controlled display system as recited in claim 17 wherein said book generation circuitry is further comprised of circuitry for ordering pages in said book based on said ordered list of linked documents.

19. The method as recited in claim 11, wherein said step of obtaining an ordered list of linked documents and the content of said linked documents is further comprised of the steps of:

a1) selecting a first document at said common server and ordering as a first document in said list of linked documents;

a2) finding relative links in said first document and retrieving the linked documents;

a3) finding relative links in subsequently retrieved linked documents and retrieving the linked documents until all relative links have been found and corresponding documents retrieved; and a4) ordering said linked documents in the order that they are retrieved.

20. An article of manufacture comprising:

a computer usable medium having computer readable program code means embodied therein for enabling a computer to present viewable lists of linked documents, the computer readable program codes means in said article of manufacture comprising:

computer readable program code for causing a computer to access a collection of linked documents, said collection of linked documents having a plurality of documents at a common server, said documents at said common server linked by relative links;

computer readable program code for causing said computer to generate an ordered list of linked documents residing on said common server using said relative links;

computer readable program code instructions for causing said computer to generate page objects for each document in said list of linked documents, each of said page objects comprising a content portion and a page control portion, said content portion including links to other documents in said ordered list of linked documents;

computer readable program code for causing said computer to generate a representation of said list of linked documents as a book for displaying on a display coupled to said computer, said representation based on the order of said list of linked documents said book on said display comprising:

a first area for displaying a first page object as a first left page of a book displayed on said display, said first left page having active contents when displayed;

a second area for displaying a second page object as a second right page of said book displayed on said display said second right page having active contents when displayed; and a control area for displaying control buttons, said control buttons for enabling a user to generate input to said book generation circuitry for generating subsequent representations of said list of linked documents; and computer readable program code for enabling a user to traverse through said list of linked documents as if they were turning pages in a book by selecting links in said content portion of a page object.

21. An article of manufacture comprising:

a computer usable medium having computer readable program code means embodied therein for enabling a computer to present viewable lists of linked documents, the computer readable program code means in said article of manufacture comprising:

computer readable program code for causing a computer to access a collection of linked documents to create a list of linked documents;

computer readable program code instructions for causing said computer to generate page objects for each document in said list of linked documents, each of said page objects comprising a content portion and a page control portion, said content portion capable of including links to other documents in said list of linked documents;

computer readable program code for creating a representation of said list of documents using said page objects created for each document in said list of documents, said representation displaying a plurality of page objects simultaneously, and wherein each page object is active when displayed.

22. The article of manufacture as recited in claim 21 wherein said computer readable program code means is further comprised of:

computer readable program code for circuitry for ordering said list of documents; and said computer readable program code for creating a representation of said list of documents, creates said representation according to said order of said list of documents.

23. The article of manufacture as recited in claim 22 wherein said computer readable program code for creating a representation of said list of documents, creates said representation using a book metaphor.

* * * * *